United States Patent

Reinsch

[11] Patent Number: 5,943,168
[45] Date of Patent: Aug. 24, 1999

[54] SAWTOOTH INTERLEAVE POLARIZATION COMBINER

[75] Inventor: Stephen J. Reinsch, Escondido, Calif.

[73] Assignee: Hughes-JVC Technology Corporation, Carlsbad, Calif.

[21] Appl. No.: 08/927,244

[22] Filed: Sep. 11, 1997

[51] Int. Cl.$^6$ ...................................................... G02B 5/30
[52] U.S. Cl. ............................................ 359/495; 359/496
[58] Field of Search ........................... 349/5, 8; 353/20; 359/487, 495, 496; 362/19

[56] References Cited

U.S. PATENT DOCUMENTS

| | | |
|---|---|---|
| 2,887,566 | 5/1959 | Marks . |
| 3,876,285 | 4/1975 | Schwarzmüller . |
| 4,497,534 | 2/1985 | Sincerbox . |
| 4,798,448 | 1/1989 | Van Raalte . |
| 5,056,887 | 10/1991 | Ohshima . |
| 5,124,841 | 6/1992 | Oishi . |
| 5,134,516 | 7/1992 | Lehureau et al. . |
| 5,164,854 | 11/1992 | Takanashi et al. . |
| 5,181,054 | 1/1993 | Nicolas et al. . |
| 5,282,600 | 2/1994 | Weiss et al. . |
| 5,359,455 | 10/1994 | Oishi . |
| 5,530,489 | 6/1996 | Henderson et al. . |
| 5,621,551 | 4/1997 | Henderson et al. . |
| 5,724,183 | 3/1998 | Yoshida ................................. 359/487 |

FOREIGN PATENT DOCUMENTS

| | | |
|---|---|---|
| 403196015 | 8/1991 | Japan . |
| 404058214 | 2/1992 | Japan . |
| 404058215 | 2/1992 | Japan . |
| 404139416 | 5/1992 | Japan . |

*Primary Examiner*—Cassandra Spyrou
*Assistant Examiner*—Craig Curtis
*Attorney, Agent, or Firm*—Harness, Dickey & Pierce, P.L.C.

[57] ABSTRACT

A polarized light optimization system for increasing the percentage of usable light for image projector illumination purposes. The system includes a light source, and a beam splitter that splits randomly polarized light from the light source into first and second beams having first and second polarizations. A polarization converter or rotator converts the polarization of one of the beams into the polarization of the other beam. Recombination means recombines the beams into a singularly polarized third beam, thereby increasing system illumination by increasing the percentage of usable light output from the light source. The recombination means includes a sawtooth mirror that has a plurality of substantially parallel equiangular mirrored facets that reflect incident light in a manner that maintains a radiation angle of divergence identical to that of the input randomly polarized light beam, thereby maintaining a maximum light contrast as the polarized beam is transmitted through the projector prism onto a projector light valve.

20 Claims, 2 Drawing Sheets

SAWTOOTH INTERLEAVE POLARIZATION COMBINER

BACKGROUND OF THE INVENTION

1. Technical Field

The present invention relates generally to liquid crystal light valve projectors and, more specifically, to a projector polarization system that increases the amount of usable projector light by polarizing and interleaving light beams from a projector light source.

2. Discussion

The quality of an image output from a conventional liquid crystal light valve (LCLV) projector is directly dependent upon the light contrast provided by a projector light source. Typically, the projector light source outputs a light beam including first and second orthogonal polarized components. The first component provides contrast to the images projected onto the projector light valve or valves, while the second component is considered unusable, or waste light, for light valve contrast purposes.

To provide a higher degree of contrast, light polarization systems have been developed for LCLV projectors. These polarization systems typically split the randomly polarized light beam into the above-mentioned first and second orthogonal linear polarized components, convert the second polarized component, as the first component and then recombine the two polarized light beam components for light valve illumination purposes.

Such conventional light polarization systems increase the angle of divergence of the combined polarized light beam. Therefore, the recombined polarized light beam has a much larger angle of divergence than the light beam input from the light source. The increased angle of divergence is undesirable, as the light valve prism plate is angle sensitive, and provides less contrast to the image formed on the light valve as the angle of divergence increases.

Therefore, there is a need for a light polarization system for an LCLV projector that increases the percentage of usable light input from a light source by maintaining the original angle of divergence of the light when the polarized light is recombined and projected onto a light valve through an angle sensitive prism or polarizer.

SUMMARY OF THE INVENTION

Accordingly, the present invention provides a system for polarizing a beam of light that maximizes the amount of usable light. The system splits an unpolarized beam of light into two polarized orthogonal beams, rotates the light beams so that each polarized light beam is in the same direction and recombines the two light beams into a single output light beam that has an angle of divergence identical to that of the unpolarized input light beam. The polarized output beam therefore utilizes a higher percentage of light from the light source than conventional light polarization systems.

In particular, the present invention provides a polarized light optimization system that includes a light source and a beam splitter that splits light input from the light source into first and second beams having first and second polarizations, respectively. A light polarizer converts the polarization of the second beam from the second polarization to the first polarization. Recombination means recombines the first and second beams into a third beam having the first polarization. The third beam, upon being projected, increases illumination provided by the beam by increasing the percentage of usable light output from the light source.

According to another preferred embodiment of the present invention, a polarized light combiner is provided. The combiner includes a plurality of radiation sources that respectively provides a plurality of beams of radiation of like polarization. A sawtooth mirror having a plurality of substantially parallel equiangular mirrored facets is provided. The mirror reflects radiation incident thereon in a manner that maintains the radiation angle of divergence and that interleaves radiation from the plurality of beams into a combined beam of radiation having a single polarization. A radiation output outputs the combined beam of radiation for illumination purposes.

BRIEF DESCRIPTION OF THE DRAWINGS

The various advantages of the present invention will become apparent to those skilled in the art after studying the following specification and by reference to the drawings in which.

DETAILED DESCRIPTION OF THE PREFERRED EMBODIMENT OF THE INVENTION

Figure 1:
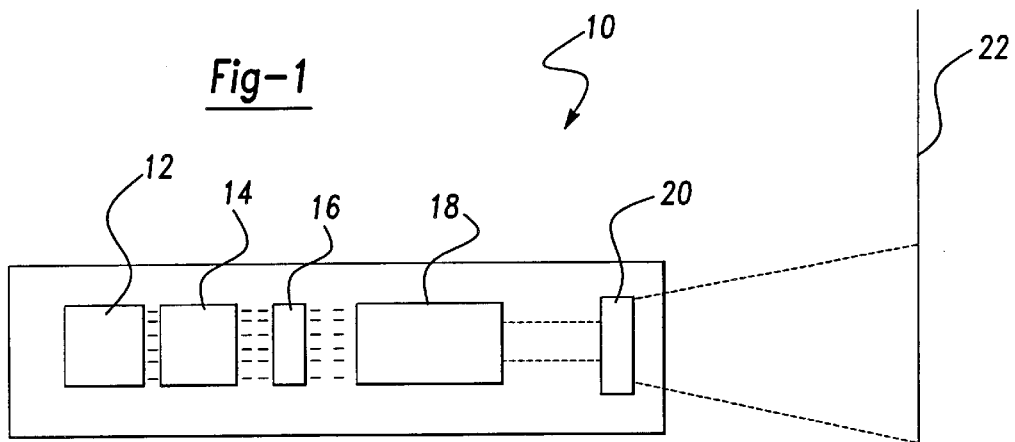
FIG. 1 is a schematic representation of a liquid crystal light valve projector incorporating the light polarization system of the present invention.

Referring now to FIG. 1, a liquid crystal light valve (LCLV) projector incorporating the light polarization system of the present invention is shown generally at 10. In a preferred embodiment of the present invention, the projector 10 is one of the commercially available Hughes-JVC projector Models 300, 320, 340 or 360. The projector 10 includes a light source 12 which is preferably an arc lamp that produces an unpolarized light beam. The arc lamp 12 is connected to a light polarization system 14 according to the present invention. As will be described in more detail below, the light polarization system 14 splits the light from the lamp 12 into a first beam of polarized light and a second orthogonal beam of polarized light, transforms one beam of polarized light to the same direction as the other and recombines the two beams of polarized light into a single output beam.

The light polarization system 14 optically communicates with a liquid crystal light valve (LCLV) 16 of the type well known in the art to form a projection image thereon. The light valve in turn optically generates red, green and blue primary color images, and communicates the images to converging optics 18. The converging optics cause the images to converge at a convergence plane as is well known in the art. The converging optics 18 in turn optically communicate with a projection lens 20 that projects the converged primary color images on a screen 22 to form a composite full color image.

While only one light valve is shown in the projector in FIG. 1, it should be appreciated that the projector may have a single light valve having three separate portions, with each portion generating one of the red, green and blue primary color images. Alternatively, the projector may include three separate light valves each generating one of the red, green and blue primary color images. For ease of illustration and understanding, only the single light valve 16 and its associated raytrace is shown.

Figure 2:
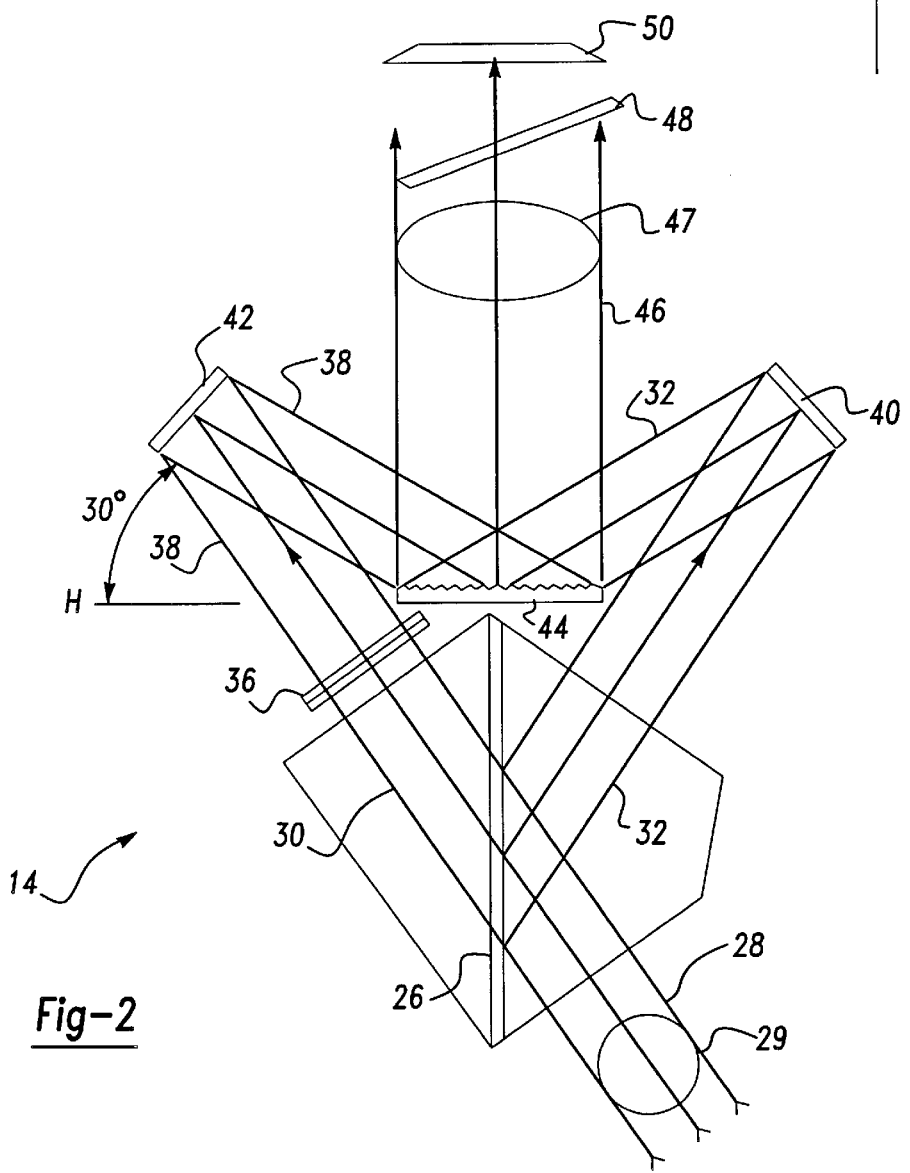
FIG. 2 is a schematic representation of the light polarization system shown in FIG. 1.

Referring to FIG. 2, a detailed schematic illustration of the light polarization system 14 according to a preferred embodiment of the present invention is shown. The system 14 includes a beam splitter 26 of the type well known in the art. The beam splitter 26 splits an input beam of light 28, shown in cross-section at 29, into two separate beams, one being a polarized beam of light 30 and one being an orthogonal polarized beam of light 32. In one preferred embodiment of the present invention, the beam splitter 26 is of the type disclosed in pending U.S. patent application Ser. No. 08/915,149 filed Aug. 20, 1997 entitled "Liquid Crystal Display Parallel Plate Beam Splitter Configuration And High Index Glass," assigned to the Assignee of the present invention and incorporated herein by reference.

The system 14 also includes a one half wave plate 36 that converts the one polarized beam of light 30 into a beam of light 38 that has a polarization identical to the beam 32. Mirrors 40, 42 reflect the light beams 32, 38, respectively, onto a sawtooth interleave polarization combiner mirror 44. The mirror 44, as will be described below, reflects the light beams 32, 38 in a manner that interleaves the two light beams 32, 38 into a single light beam 46 comprised of multiple parallel beams of polarized light, and having an angle of divergence identical to the angle of divergence of the input beam of light 28. As shown in cross-section at 47, the light beam 46 has a cross section in the X direction that is twice that of the input beam, and has a cross section in the Y direction that is identical to that of the input beam. The light beam is incident on a prism plate 48, which may be an oil or glass prism plate, before being reflected onto a light valve 50. Because the divergence angle of the beam 46 is not increased subsequent to the polarization of the light therein, the beam 46 thereby provides maximum contrast to the light valve 50 as it is incident upon the angle sensitive prism plate 48.

Figure 3:
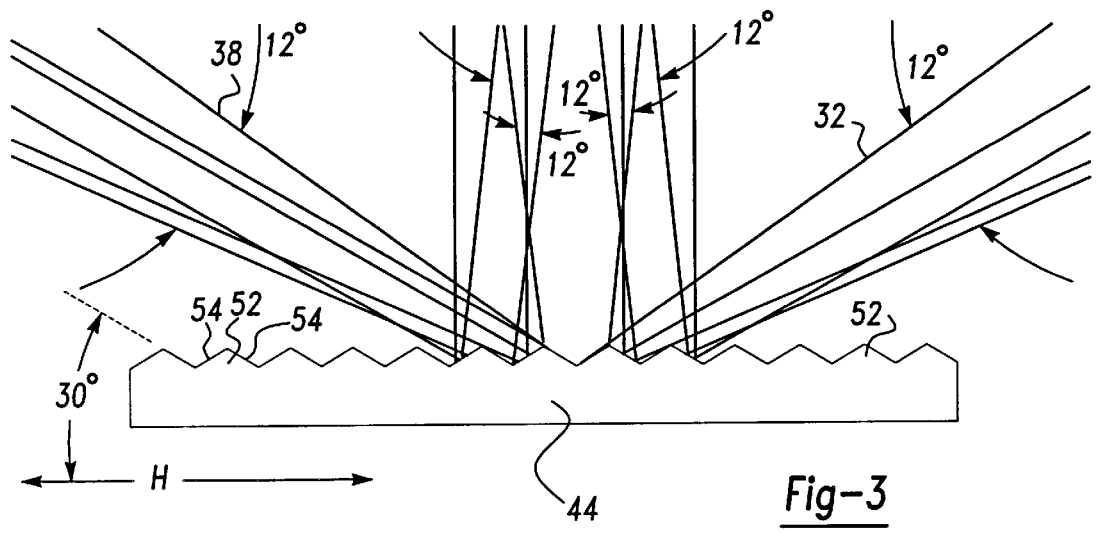
FIG. 3 is an isolated view the sawtooth combiner mirror shown in FIG. 2, along with an associated ray trace of light incident on the surface of the mirror.
Figure 4:
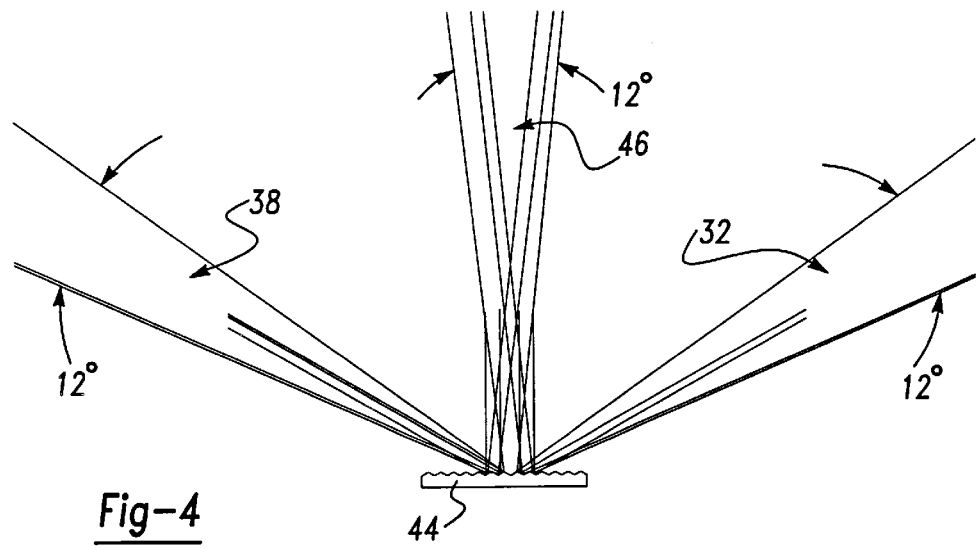
FIG. 4 is an isolated view of the mirror shown in FIG. 3 showing the ray trace in more detail.
Figure 5:
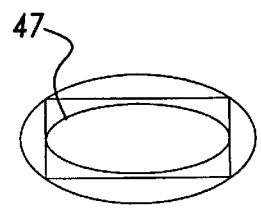
FIG. 5 shows the elliptical projector output resulting from the polarization combiner of the present invention.

Referring to FIGS. 3 and 4, more detailed schematic illustrations of the sawtooth mirror 44 are shown. The sawtooth mirror 44 includes a plurality of facets 52 each having equiangular mirrored surfaces 54. The facets are coplanar, with each mirrored surface being parallel to like mirrored surfaces of the other facets. Preferably, each mirrored surface 54 is oriented at an angle of about 30° with respect to a horizontal reference plane designated by the line H in FIG. 3.

With the sawtooth mirror 44 being constructed as described above, each of the mirrors 40, 42 are positioned such that the light beams 32, 38 reflected therefrom are incident on the mirrored facets at an angle of approximately 30° with respect to the horizontal reference plane H. As a result, each of the beams 32, 38, which are actually a plurality of individual beams, are reflected from the mirrored facets to form the light beam 46. The individual beams of the light beams 32, 38 are reflected in a manner such that the beams are spread apart in a 2:1 ratio in the X direction such that the individual rays from both beams 32, 38 are interleaved into the light beam 46 having the same polarization as beams 32 and 38. The elliptical output 47 of the sawtooth interleave polarization combiner of the present invention thereby helps to fill a 3:4 or a 9:16 aspect ratio better than a standard output round light beam.

FIGS. 3 and 4 illustrate the reflected rays in the light beam 46, before the mirror is put into the system, to illustrate the effect of the folding of these rays by the sawtooth mirror. Also, for the particular embodiment shown, both light beams 32, 38 have an angle of divergence of 12° as the beams are incident upon the mirrored surfaces 54 of the sawtooth mirror. This angle of divergence remains at 12° after the formation of the light beam 46, thereby maximizing the associated contrast of the beam 46 as the beam is input onto the surface of the light valve 50 through the prism 48. Thus, although the beam 46 may be wider than the beams 32, 38, the total divergence angle remains the same for beam 46 as with the input beam 28.

Upon reading of the foregoing description, it should be appreciated that the sawtooth interleave polarization combiner of the present invention combines same polarization light beams into a single light beam having an angle of divergence identical to that of the input randomly polarized light beam. The polarization combiner of the present invention thereby effectively increases usable light in a video projector system, without increasing projector lamp size or power requirements, by making what was heretofore waste light into usable light. The polarization combiner of the present invention increases usable light without increasing the angle of divergence of the light, and thus the requirement for a light valve input aperture larger than the image area on the light valve itself, thereby minimizing system cost and dimensional requirements. The sawtooth interleave polarization combiner of the present invention also eliminates problems associated with prior art polarization systems due to the fact that the combined divergence angles of the split beams of polarized light were often too large for polarization optics to work properly.

What is claimed is:

1. A light polarization system, comprising:

a light source;

a beam splitter that splits light input from the light source into first and second beams having first and second polarizations, respectively;

a polarization light rotator that converts the polarization of the second beam from the second polarization to the first polarization; and a beam recombiner that recombines the first and second beams into a third beam having the first polarization to increase system illumination upon projection of the third beam, thereby increasing the percentage of usable light output from the light source, the beam recombiner including first, second and third mirrors, the first and second mirrors reflecting the first and second beams, respectively, onto the third mirror, the third mirror recombining the first and second beams without increasing the original divergence angle of the first and second beams.

2. The system of claim 1, wherein the third mirror comprises a sawtooth mirror having a plurality of equiangular facets that each maintain the original input angle of light incident on each facet to optimize projection optics parameters.

3. The system of claim 2, wherein each of the plurality of facets is oriented substantially at a 30° angle with respect to a reference horizontal plane when the mirror is positioned parallel to the reference horizontal plane.

4. The system of claim 3, wherein the first and second beams are incident on the sawtooth mirror at an angle corresponding generally to 30° with respect to the reference horizontal plane.

5. The system of claim 1, wherein the beam recombiner spreads the third beam of light in approximately a 2:1 ratio in a first direction and maintains the ratio of the light in a second direction orthogonal to the first direction to give the light reflected therefrom substantially elliptical projection beam characteristics.

6. The system of claim 1, wherein the polarization light rotator comprises a half wave plate.

7. The system of claim 1, wherein the polarization light rotator operates on the second beam for implementing one-half wave rotation.

8. A polarized light combiner, comprising:
- a beam splitter for providing a plurality of beams of radiation at a radiation angle of divergence, said beamsplitter providing a first beam of light to a first mirror and a second beam of light to a second mirror, the first mirror reflecting the first beam and the second mirror reflecting the second beam, the first and second mirrors being disposed at substantially similar angles with respect to a reference horizontal plane;
- a sawtooth mirror for receiving the first and second beams of light from the first and second mirrors, the sawtooth mirror being disposed parallel to the reference horizontal plane, and the sawtooth mirror having a plurality of substantially equiangular mirrored facets that reflect radiation incident thereon in a manner that maintains the radiation angle of divergence and that interleaves radiation from the plurality of beams of radiation into a single combined beam of radiation; and
- a radiation output for producing the single combined beam of radiation for illumination purposes.

9. The apparatus of claim 8, wherein the plurality of beams of radiation are each converted into a second plurality of beams of radiation having like polarization before being reflected onto the sawtooth mirror.

10. The apparatus of claim 8, wherein each mirrored facet has an angle of 30° with respect to the reference horizontal plane.

11. The apparatus of claim 8, wherein each facet separates radiation incident thereon into a separate beam of radiation that is reflected in substantially parallel relationship with separate beams of radiation reflected by each of the plurality of facets, to thereby form an interleaved recombined light beam having a plurality of substantially parallel beams of radiation at substantially the radiation angle of divergence.

12. The apparatus of claim 8, wherein the single beam of radiation output from the radiation output has a 2 to 1 cross-sectional ratio.

13. The apparatus of claim 8, wherein the each of the plurality of beams of radiation comprise a beam of light in the visible wavelength spectrum.

14. A light polarization system, comprising:
- a light source;
- a beam splitter for splitting light input from the light source into first and second beams having first and second polarizations, respectively;
- a polarization light rotator for converting the polarization of the second beam from the second polarization to the first polarization; and
- a beam recombiner for recombining the first and second beams into a third beam having the first polarization to increase system illumination upon projection of the third beam, thereby increasing the percentage of usable light output from the light source, the beam recombiner including first, second and third mirrors, the first and second mirrors being disposed at substantially similar angles with respect to the third mirror for reflecting the first and second beams, respectively onto the third mirror, the third mirror recombining the first and second beams into the third beam without increasing the original divergence angle of the first and second beams.

15. The system of claim 14, wherein the third mirror comprises a sawtooth mirror having a plurality of equiangular facets that each maintain the original input angle of light incident on each facet to optimize projection optics parameters.

16. The system of claim 15, wherein each of the plurality of facets is oriented substantially at a 30° angle with respect to a reference horizontal plane.

17. The system of claim 16, wherein the first and second beams are incident on the sawtooth mirror at an angle corresponding generally to 30° with respect to the reference horizontal plane.

18. The system of claim 14, wherein the beam recombiner spreads the third beam of light in approximately a 2:1 ratio in a first direction and maintains the ratio of the light in a second direction orthogonal to the first direction to give the light reflected therefrom substantially elliptical projection beam characteristics.

19. The system of claim 14, wherein the polarization light rotator includes a half-wave plate.

20. The apparatus of claim 15, wherein each facet separates radiation incident thereon into a separate beam of radiation that is reflected in substantially parallel relationship with separate beams of radiation reflected by each of the plurality of facets, to thereby form an interleaved recombined light beam having a plurality of substantially parallel beams of radiation at substantially the radiation angle of divergence.

* * * * *